US011485022B2

(12) United States Patent
Funazukuri et al.

(10) Patent No.: US 11,485,022 B2
(45) Date of Patent: Nov. 1, 2022

(54) DIALOGUE APPARATUS AND CONTROL PROGRAM FOR DIALOGUE APPARATUS

(71) Applicant: Toyota Jidosha Kabushiki Kaisha, Toyota (JP)

(72) Inventors: Mina Funazukuri, Sumida-ku Tokyo-to (JP); Tomoya Takatani, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 507 days.

(21) Appl. No.: 16/661,481

(22) Filed: Oct. 23, 2019

(65) Prior Publication Data

US 2020/0130195 A1    Apr. 30, 2020

(30) Foreign Application Priority Data

Oct. 25, 2018 (JP) .............................. JP2018-200831

(51) Int. Cl.
*G10L 15/22*    (2006.01)
*B25J 11/00*    (2006.01)
*G10L 13/027*    (2013.01)

(52) U.S. Cl.
CPC ......... *B25J 11/0015* (2013.01); *G10L 13/027* (2013.01); *G10L 15/22* (2013.01); *G10L 2015/223* (2013.01)

(58) Field of Classification Search
CPC ....................................................... G10L 15/22
See application file for complete search history.

(56) References Cited

U.S. PATENT DOCUMENTS

2018/0366121 A1* 12/2018 Funazukuri ............. G10L 15/22
2019/0077009 A1*  3/2019 Huang .................... H04L 51/02

FOREIGN PATENT DOCUMENTS

JP         2012-086348 A    5/2012
JP         2017-207693 A    11/2017

* cited by examiner

*Primary Examiner* — Ibrahim Siddo
(74) *Attorney, Agent, or Firm* — Dinsmore & Shohl LLP

(57) ABSTRACT

A dialogue apparatus includes a display unit, a first dialogue control unit configured to display a first character on the display unit and simulate a speech function of an external communication robot capable of having a dialogue to conduct the dialogue with a user, a second dialogue control unit configured to display a second character on the display unit and conduct the dialogue so as to mediate the dialogue between the user and the first dialogue control unit, and a transmission unit configured to transmit, to the external communication robot, dialogue information about the dialogue conducted by the first dialogue control unit and the second dialogue control unit.

9 Claims, 9 Drawing Sheets

FIRST ENVIRONMENT

SECOND ENVIRONMENT

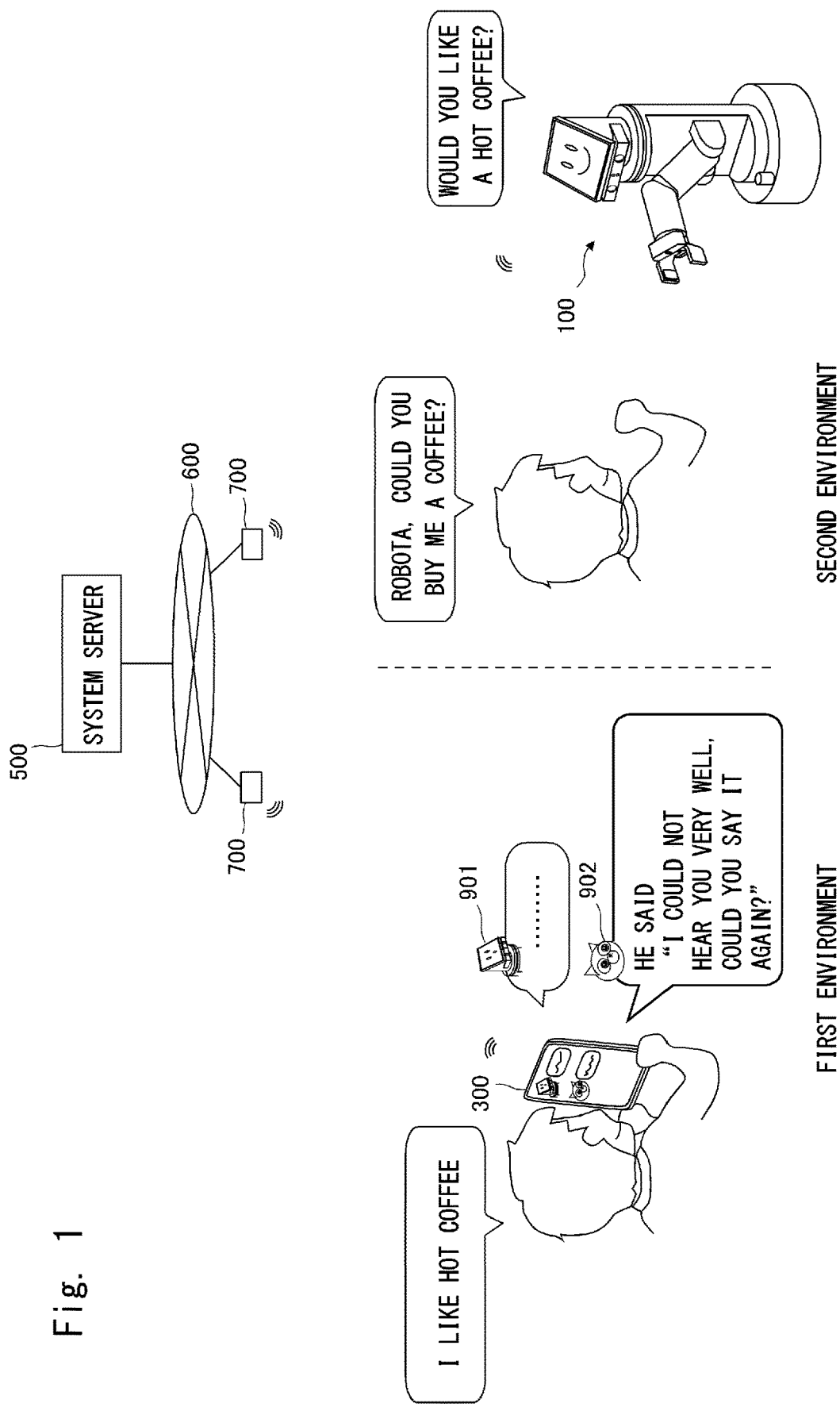

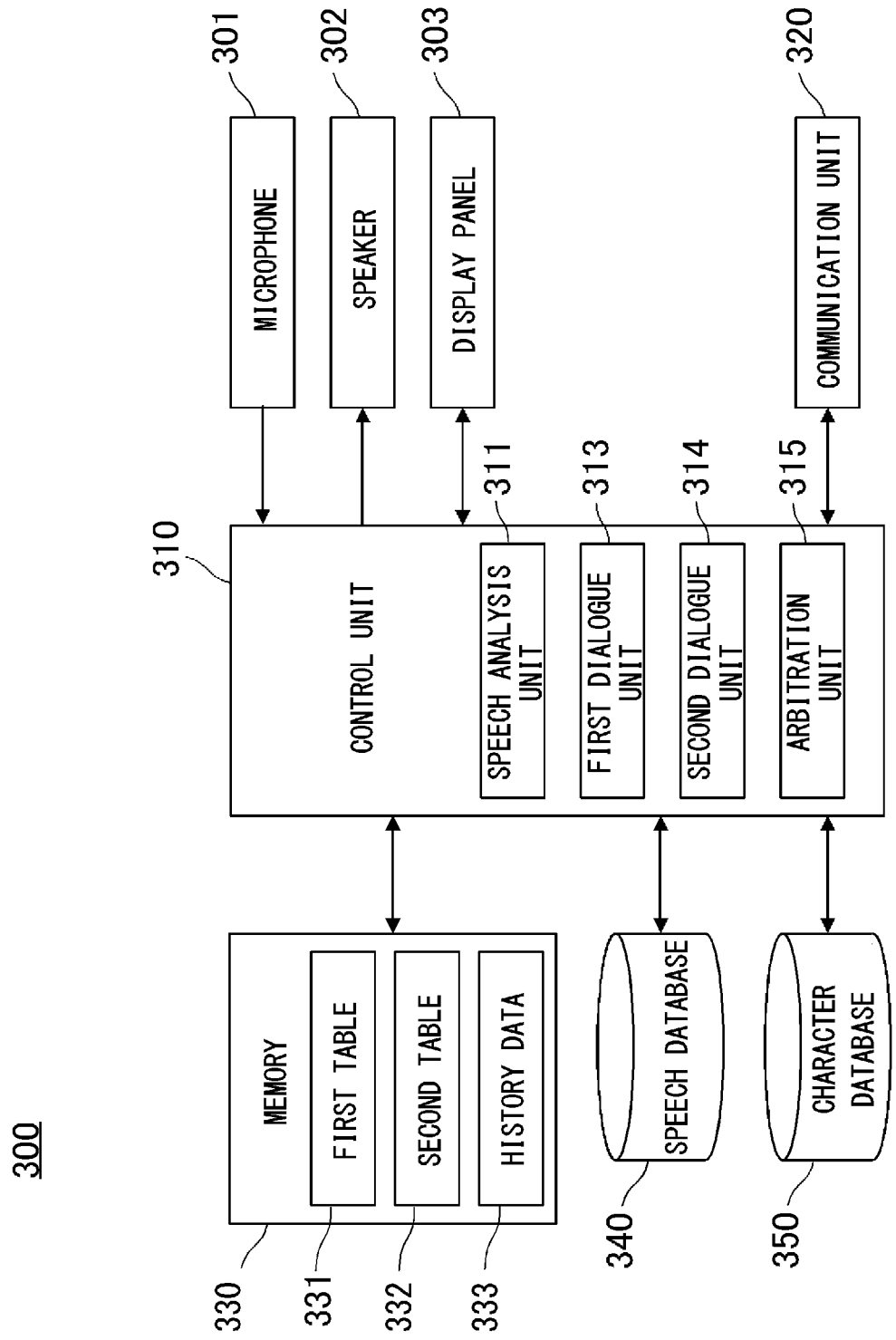

FIRST TABLE (PSEUDO CHARACTER)

| | |
|---|---|
| DISPLAY CHARACTER | C01 |
| VOICE SOUND | V03 |
| CONVERSATION SPEED | LOW |
| SELECTED TERM LEVEL | C |
| TEMPER CHANGE FREQUENCY | MEDIUM |
| IN-CONVERSATION GESTURE | LITTLE |
| VOICE IDENTIFICATION LEVEL | D03 |
| SPEECH MODULE LEVEL | M02 |

SECOND TABLE (MEDIATING CHARACTER)

| | |
|---|---|
| DISPLAY CHARACTER | C07 |
| VOICE SOUND | V06 |
| CONVERSATION SPEED | HIGH |
| SELECTED TERM LEVEL | A |
| TEMPER CHANGE FREQUENCY | MEDIUM |
| IN-CONVERSATION GESTURE | MANY |

Fig. 4

DIALOGUE APPARATUS AND CONTROL PROGRAM FOR DIALOGUE APPARATUS

CROSS REFERENCE TO RELATED APPLICATIONS

This application is based upon and claims the benefit of priority from. Japanese patent application No. 2018-200831, filed on Oct. 25, 2018, the disclosure of which is incorporated herein in its entirety by reference.

BACKGROUND

The present disclosure relates to a dialogue apparatus and a control program of the dialogue apparatus.

Service providing robots capable of autonomous movement are coming into practical use. Some of these service robots include a voice recognition function and a speech function and communicate with a user through dialogues (see, for example, Japanese Unexamined Patent Application Publication No. 2012-86348).

Communication robots capable of autonomous movement are often available to a user only at limited places. Thus, it may be difficult for the user to feel attached to the communication robot or for the communication robot to acquire the user's temperament. Thus, in a situation where the communication robot is not available, an application which allows the user to communicate with a character reproducing the communication robot in a pseudo manner on a mobile terminal such as a smartphone has come to be known. When the communication robot receives a result of repeated communication, on the mobile terminal, between the user and the character from the mobile terminal as history information of the communication, the communication robot can communicate appropriately with the user. The user eventually feels attached to the communication robot through such communication.

SUMMARY

An environment where a communication robot is used is often disadvantageous in terms of communication as compared with an environment where the user uses a mobile terminal. For example, in a common public space, there are a lot of noises, which reduces the speech recognition accuracy. Further, it may be difficult to provide a high-performance dialogue system in some types of communication robot. In such a cases a difference is generated between the smoothness and the depth of the communication with the communication robot and those the communication with the character reproduced by the mobile terminal. Then, the user feels that the communication with the communication robot and the communication with the character are two distinct communication, which adversely affects the fostering of the attachment to the communication robot.

The present disclosure provides a dialogue apparatus and the like which allow a user to enjoy a dialogue smoothly without stress with a character reproducing a communication robot so that the user can feel attached to an external communication robot capable of having a dialogue.

A first example aspect of the present disclosure is a dialogue apparatus including: a display unit; a first dialogue control unit configured to display a first character on the display unit and simulate a speech function of an external communication robot capable of having a dialogue to conduct the dialogue with a user; a second dialogue control unit configured to display a second character on the display unit and conduct the dialogue so as to mediate the dialogue between the user and the first dialogue control unit; and a transmission unit configured to transmit, to the external communication robot, dialogue information about the dialogue conducted by the first dialogue control unit and the second dialogue control unit.

By including such a first dialogue control unit, the user can communicate with the first character in a similar manner to communicating with the external communication robot. Further, by including the second dialogue control unit, it is possible to reduce awkwardness and stress that may occur in the communication with the first dialogue control unit. Moreover, by the transmission unit transmitting the dialogue information to the external communication robot, the user can have continuous communication with the external communication robot, and eventually feel more attached to the external communication robot.

The above dialogue apparatus may further include a reception unit configured to receive the dialogue information about the dialogue conducted by the external communication robot. The first dialogue control unit may be configured to conduct the dialogue based on the dialogue information received by the reception unit. Such a configuration enables the user to continue the communication with the dialogue apparatus which has been performed with the external communication robot. That is, further integrity can be given to the first character of the dialogue apparatus and the external communication robot.

In the above dialogue apparatus, the first dialogue control unit may not conduct a dialogue in an environment where the user can have a dialogue with the external communication robot. By not explicitly showing, the first character in such an environment, a feeling of switching between the first character and external communication robot can be produced, and thus further integrity can be given to fire first character of the dialogue apparatus and the external communication robot. In this case, the second dialogue control unit may conduct a dialogue so as to mediate the dialogue between the user and the external communication robot. The user can enjoy the dialogue smoothly with the external communication robot by the second dialogue unit mediating and assisting the dialogue between the user and the external communication robot.

In the above dialogue apparatus, the second dialogue control unit may conduct a dialogue so as to supplement a speech limited by the speech function of the external communication robot. When a dialogue system mounted on the dialogue apparatus has high performance, the performance can be exhibited through the second dialogue control unit. This achieves smoother communication.

In the above dialogue apparatus, the speeches by the first dialogue control unit and the second dialogue control unit are executed via at least one of a voice emitted from a speaker or a text displayed on the display unit. When the user can select whether the speech is executed in a voice or a text, dialogues can be conducted in various environments.

A second example aspect of the present disclosure is a control program of a dialogue apparatus causing a computer to execute: a first dialogue control step of displaying a first character on a display unit and simulating a speech function of an external communication robot capable of having a dialogue to conduct the dialogue with a user; a second dialogue control step of displaying a second character on the display unit and conducting the dialogue so as to mediate the dialogue with the user in the first dialogue control step; and a transmitting step of transmitting, to the external communication robot, dialogue information about the dialogue conducted in the first dialogue control step and the dialogue conducted in the second dialogue control step. According to the dialogue apparatus in which such a program is executed by a computer, like in the first aspect, the user can communicate with the first character reproducing the external communication robot, and a smooth dialogue that does not cause stress to the user by the mediation of the second character can be achieved.

According to a dialogue apparatus and the like according to the present disclosure, a user can enjoy a dialogue smoothly without stress with a character reproducing a communication robot, and then eventually the user can feel attached to an external communication robot capable of having a dialogue.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 1 is a view showing a state of communication according to an embodiment;
FIG. 3 is a system configuration diagram of the communication terminal;
FIG. 4 shows an example of a lookup table which describes an operation standard of a character.

DETAILED DESCRIPTION

Figure 2A:
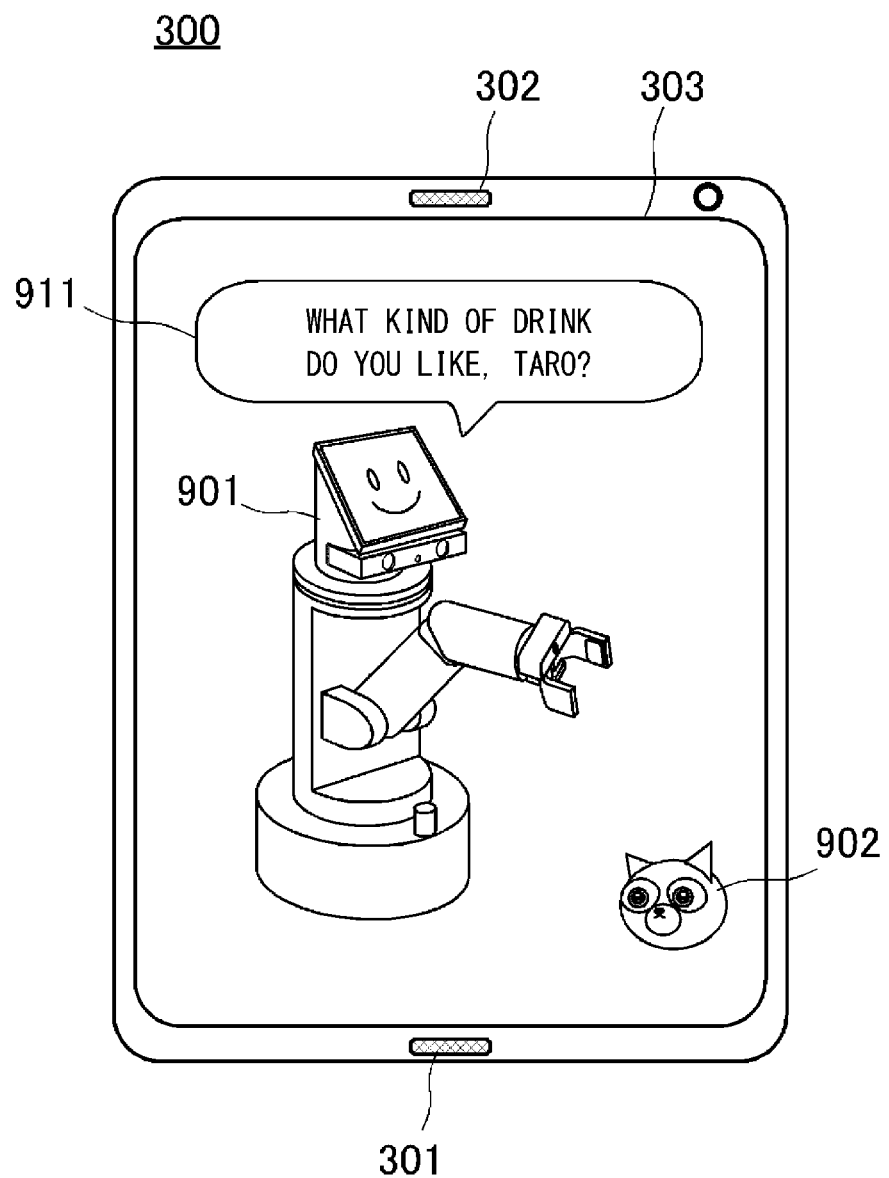
FIG. 2A is a view showing a state of a dialogue conducted by a communication terminal.

FIG. 1 is a view showing a state of communication according to this embodiment. A communication terminal 300 as a dialogue apparatus is, for example, a tablet terminal or a smartphone. The communication terminal 300 can execute an artificial dialogue with a user when a computer executes a program. A first environment is an environment where the communication terminal 300 is used, and is, for example, the user's home. A robot 100 is not present in the first environment.

The robot 100 as an external communication robot capable of having a dialogue is, for example, a service robot capable of autonomous movement. The robot 100 can conduct an artificial dialogue with the user when the computer executes a program. A second environment is an environment where the robot 100 is used and is, for example, a sports stadium. The user may use the communication terminal 300 also in the second environment, as will be described later.

The robot 100 and the communication terminal 300 can exchange information with each other via a system server 500 connected to the Internet 600. The communication terminal 300 is connected to a system server 500 via a wireless router 700 installed in the first environment, for example, by a wireless LAN. Likewise, the robot 100 is connected to the system server 500 by, for example, a wireless LAN via a wireless router 700 installed in the second environment. The system server 500 mediates exchange of dialogue information and the like between the robot 100 and the communication terminal 300 which are associated with each other.

When the user speaks to the communication terminal 300 in the first environment, for example, "I like hot coffee", this content is transmitted to the robot 100 as the dialogue information. When the robot 100 is requested by the user in the second environment, for example, "Robota, could you buy me a coffee?", the robot 100 makes a response speech such as, "Would you like a hot coffee?" based on the received dialogue information. That is, the content of the user speaking to the communication terminal 300 as a dialogue partner is transmitted to the robot 100 as the dialogue information, and the robot 100 refers to the dialogue information to generate a response sentence appropriate for the user speech and utters the response sentence.

The communication terminal 300 prepares two characters to be displayed as dialog, partners for the user. One is a pseudo character 901 that simulates a speech function of the robot 100 to conduct a dialogue with the user, and the other is a mediating character 902 that conducts a dialogue for mediating the dialogue between the user and the pseudo character 901. When the pseudo character 901 that simulates the speech function of the robot 100 cannot respond appropriately to the user speech, the mediating character 902 speaks, for example, "He said, 'I could not hear you very well, could you say it again?'". That is, the mediating character 902 performs a supplementary speech so that the dialogue conducted between the user and the pseudo character 901 proceeds smoothly.

Figure 2B:
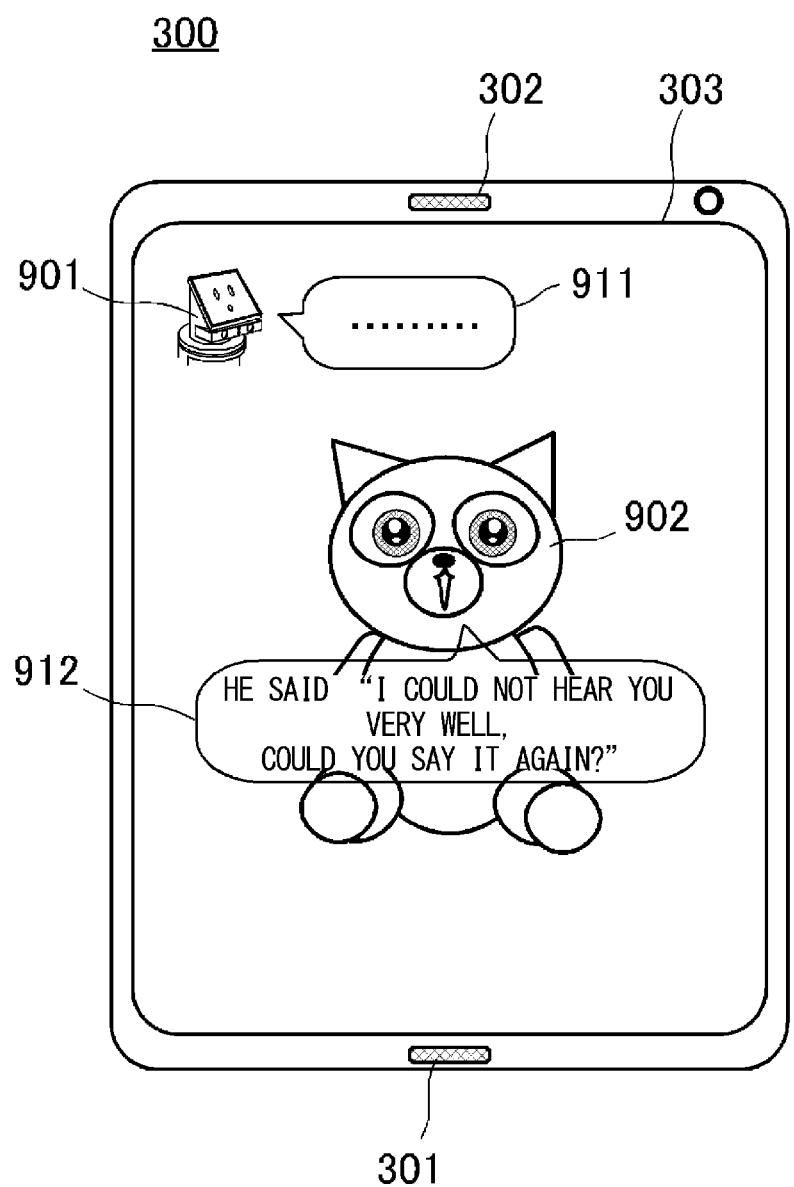
FIG. 2B is a view showing the state of dialogue conducted by the communication terminal.

The proceeding of such a dialogue will be further described. FIGS. 2A and 2B are views showing the state of a dialogue conducted by the communication terminal 300. FIG. 2A mainly shows the state in which the pseudo character 901 is displayed on the display panel 303 of the communication terminal 300. The communication terminal 300 includes a microphone 301 and a speaker 302. The communication terminal 300 captures a voice uttered by the user from the microphone 301, and emits a generated response speech sentence from the speaker 302 as a voice.

The display panel 303 is, for example, an organic EL display. The pseudo character 901 displayed on the display panel 303 is, for example, an illustration imitating the robot 100. The pseudo character 901 may be accompanied by an action of animation, or may be configured to change a facial expression according to the user speech and the response speech. The pseudo character 901 may be an exaggerated illustration of the robot 100 or an image obtained by photographing the robot 100 which is an actual robot. Note that when there are a plurality of types of external communication robots, the user selects a pseudo character corresponding to the external communication robot he/she plans to communicate with prior to the usage thereof. When the user has been registered on the external communication robot side, a corresponding pseudo character may be automatically selected via the system server 500.

As described above, the pseudo character 901 simulates the speech function of the robot 100 to conduct a dialogue with the user. For example, when the user speaks "Its hot today, isn't it?", the communication terminal 300 generates the response speech sentence such as "What kind of drink do you like, Taro?", which is appropriate for this user speech. The generated response speech sentence is converted into a voice signal and emitted from the speaker 302. Further, the response speech sentence is displayed in a text in a balloon-type text box 911 as if the pseudo character 901 displayed on the display panel 303 is speaking. In this manner, when the dialogue between the user and the pseudo character 901 is smoothly conducted, for example, the mediating character 902 is displayed in a small manner while swinging from side to side at a corner of the display screen. The user can recognize that an assistance function for smoothly promoting the dialogue is working by the mediating character 902 being displayed, FIG. 2B shows that the mediating character 902 is mainly displayed on the display panel 303 of the communication terminal 300. As described above, the speech by the pseudo character 901 is executed by simulating the speech function of the robot 100. That is, the speech function of the pseudo character 901 is adjusted in such a way that it becomes intentionally inferior as compared with the speech function originally included in the communication terminal 300, with the speech performance of the dialogue system mounted on the robot 100, and the environment where the robot 100 is used as adjustment factors.

The user feels as if the pseudo character 901 displayed on the communication terminal 300 is a substitute of the robot 100 in the point that the dialogue conducted through the communication terminal 300 can be conducted in a manner similar to the dialogue with the robot 100 which is an actual robot. That is, it can be expected that the user's attachment to the robot 100 is fostered also by repeating communication with the pseudo character 901.

However, the dialogue with the pseudo character 901 having speech function may not proceed smoothly in some cases, and may cause stress to the user. Thus, when the dialogue between the user and the pseudo character 901 does not proceed smoothly, the mediating character 902 is displayed on the display panel 303, and the dialogue mediating the dialogue between the user and the pseudo character 901 is conducted. The speech function of the mediating character 902 fully exhibits the speech function originally included in the communication terminal 300.

For example, when the speech function of the pseudo character 901 cannot understand the user speech, the communication terminal 300 generates the response speech sentence having a mediating, content such as, "He said, 'I could not hear you very well, could you say it again?'" using the speech function of the mediating character 902. The generated response speech sentence is converted into a voice signal and emitted from the speaker 302. Further, the response speech sentence is displayed in a text in a balloon-type text box 912 as if the mediating character 902 displayed on the display panel 303 is speaking. When the mediating character 902 mediates the dialogue in this way, the pseudo character 901 is displayed, for example, small at a corner of the display screen together with the text box 911 indicating that the pseudo character 901 cannot understand the user speech. As described above, the mediating character 902 mediates and assists the dialogue between the user and the pseudo character 901 to thereby smoothly promote the dialogue, and reduce the user's stress.

Next, a system configuration of the communication terminal 300 will be described. FIG. 3 is a system configuration diagram of the communication terminal 300. The main elements related to communication with the user will be described here. However, the communication terminal 300 may include other elements in its configuration, and may include other elements contributing to communication.

The control unit 310 is, for example, a CPU. The control unit 310 controls the entire communication terminal 300 and executes various calculations. A main function of the microphone 301 is to collect user's spoken voices. The microphone 301 converts the collected user's spoken voice into a voice signal, and passes it to the control unit 310 as an input speech from the user. The speaker 302 receives the voice signal converted by the control unit 310, and outputs an output speech as a voice.

The display panel 303 displays the pseudo character 90, the mediating character 902, the text boxes 911 and 912, and the like according to a video signal generated by the control unit 310. The display panel 303 may display the user speech converted into a text in a text box, for example, in a chat format. The communication unit 320 is, for example, a wireless LAN unit, and performs wireless communication with a wireless router 700. The communication unit 320 may include a wireless unit for proximity communication so that, for example, the dialogue information can be directly transmitted and received when the robot 100 is present in the vicinity.

The memory 330 is a non-volatile storage medium, and for example, a solid state drive is used as the memory 330. The memory 330 stores, in addition to a control program for controlling the communication terminal 300, various parameter values, functions, lookup tables, and so on used, for control and calculation. The memory 330 stores a first table 331, a second table 332, and history data 333 in particular.

The first table 331 is a lookup table that describes an operation standard characterizing the pseudo character 901. The second table 332 is a lookup table that describes an operation standard characterizing the mediating character 902. The first table 331 and the second table 332 will be described in detail later. The history data 333 is reference data including the dialogue information about dialogues conducted so far between the user and the pseudo character 901, and the dialogue information about dialogues conducted so far between the user and the mediating character 902. When the user acquires the dialogue information about dialogues conducted with the robot 100 through the communication unit 320, the dialogue information is managed as the history data 333.

The speech database 340 is composed of, for example, a recording medium of a hard disk drive, and individual terms organized into a corpus are stored together with reproducible speech data. The speech database 340 may not be incorporated into the communication terminal 300, and instead may be connected to, for example, the Internet 600.

The character database 350 is composed of, for example, a recording medium of a hard disk drive, and stores video data of the pseudo character 901 and the mediating character 902. As for the pseudo character 901, when there are a plurality of types of external communication robots, video data corresponding to each of the types of external communication robots is stored. When the mediating character 902 is configured to be selected by the user according to his/her preference, video data corresponding to a plurality of mediating characters is stored.

The control unit 310 also functions as a functional calculation unit that executes various calculations related to control and processing. A speech analysis unit 311, a first dialogue unit 313, a second dialogue unit 314, and an arbitration unit 315 are examples of the function calculation unit.

The speech analysis unit 311 analyzes the input speech received from the microphone 301 and converts it into a text, and recognizes the user speech content. Specifically, the speech analysis unit 311 recognizes the user speech content using common voice recognition technology. For example, a word analysis, etc. is performed on the text of the input speech, and the speech content is recognized using a DNN model or a logistic regression model.

The first dialogue unit 313 bears the speech function by the pseudo character 901. That is, the first dialogue unit 313 is a dialogue control unit that refers to the first table 331, displays the pseudo character 901 on the display panel 303, simulates the speech function of the robot 100, and conducts a dialogue with the user. Specifically, the first dialogue unit 313 refers to the speech database 340 to generate the response speech sentence appropriate for the user speech, emits the response speech sentence as a voice from the speaker 302, and displays it in a text on the display panel 303.

The second dialogue unit 314 bears the speech function of the mediating character 902. That is, the second dialogue unit 314 is a dialogue control unit that refers to the second table 332, displays the mediating character 902 on the display panel 303, and conducts a dialogue so as to mediate the dialogue between the trier and the pseudo character 901. Specifically, the second dialogue unit 314 refers to the speech database 340 to generate the response speech sentence so as to assist the dialogue, emits the response speech sentence as a voice from the speaker 302, and displays it in a text on the display panel 303.

The arbitration unit 315 monitors, for each speech, whether the dialogue between the user and the pseudo character 901 is smoothly proceeding, and judges whether the mediating character 902 needs to mediate the dialogue. The arbitration unit 315 passes the next right to speak to either the first dialogue unit 313 or the second, dialogue unit 314 according to a result of the judgement.

Next, the first table 331 and the second table 332 will be described. FIG. 4 shows an example of the first table 331 and the second table 332, which are lookup tables describing the operation standards characterizing the characters.

The first dialogue unit 313 refers to the operation standard described in the first table 331 to simulate the robot 100 so that the user can feel the pseudo character 901 is a substitute of the robot 100. The first table 331 is preset to correspond to the characteristics set for the robot 100. Alternatively, the setting of the robot 100 may be acquired from the robot 100 via the Internet 600.

In this embodiment, "display character", "voice sound", "conversation speed", "selected term level", "temper change frequency", "in-conversation gesture", "voice identification level", and "speech module level" are defined as items of the operation standard. The "display character" indicates a character number corresponding to the robot 100. The first dialogue unit 313 refers to the field of the "display character" to determine the character video to be acquired from the character database 350. The "voice sound" has a symbol corresponding to the voice sound emitted by the robot 100. The first dialogue unit 313 refers to the field of the "voice sound" to determine voice data to be acquired from the speech database 340.

The "conversation speed" has a symbol corresponding to the conversation speed of a dialogue conducted by the robot 100. The first dialogue unit 313 refers to the field of the "conversation speed" to adjust the speed of the voice emitted from the speaker 302. The "selected term level" has a sign corresponding to the level of politeness of the response speech sentence generated by the robot 100. For example, the polite wording is represented by "A", and the informal wording is represented by "C". The first dialogue unit 313 refers to the field of the "selected term level" to adjust the politeness of the response speech sentence.

The "temper change frequency" has a sign corresponding to a level of a temper change set for the robot 100. For example, when the robot 100 speaks angrily in response to the user speech that makes fun of the robot 100 a little, the temper change frequency is "high", whereas when the robot 100 stays calm in such a case, the temper change frequency is "low". The first dialogue unit 313 refers to the field of the "temper change frequency" to adjust the content of the response speech sentence. The "in-conversation gesture" has a symbol corresponding to the magnitude of the gesture performed by the robot 100 during the dialogue. For example, when the robot 100 often nods its head or raises and lowers its arm, the "in-conversation gesture" is "many". The first dialogue unit 313 refers to the field of the "in-conversation gesture" to adjust the animation of the pseudo character 901 to be displayed on the display panel 303.

The "voice identification level" has a symbol corresponding to an environment where the robot 100 is used, the microphone performance of the robot 100, and the identification level of the user speech set according to the speech analysis capability of the robot 100. For example, when the environment where the robot 100 is to be used is a common public space, there, are a lot of noises, which lowers the voice identification accuracy. Thus, the "voice identification level" is set according to the level of voice identification accuracy. The first dialogue unit 313 refers to the field of the "voice identification level" to control the speech analysis unit 311 to function in a limited manner. Alternatively, the first dialogue unit 313 corrects the text output by the speech analysis unit 311. For example, the first dialogue unit 313 randomly drop some texts.

The "speech module level" has a number corresponding to the performance of a response generation module mounted on the robot 100. The first dialogue unit 313 refers to the field of the "speech module level" to select an appropriate response speech sentence from among the plurality of generated response speech sentence candidates, and then outputs the selected response speech sentence.

In the first table 331, the "voice identification level" and "speech module level" are items necessary to simulate the speech performance of the robot 100. In this embodiment, external factors such as the environment where the robot 100 is used are taken into consideration. However, in the environment where the robot 100 moves between environments with different properties, the external factors may not be considered.

The second dialogue unit 314 refers to the operation standard described in the second table 332 to conduct a dialogue so that the user can feel the mediating character 902 as a character different from the pseudo character 901. The second table 332 is preset according to the characterization set for the mediating character 902.

Like the first table 331, the second table 332 defines "display character", "voice sound", "conversation speed", "selected term level", "temper change frequency", and "in-conversation gesture" as items of the operation standard. However, the second table 332 does not include the "voice identification level" and "speech module level", which are items for simulating the speech performance of the robot 100.

When the mediating character 902 is made to speak, the field of the "display character" in the second table 332 is referred to so as to determine the character video to be acquired from the character database 350. Further, the field of the "voice sound" in the second table 332 is referred to so as to determine voice data to be acquired from the speech database 340, and the field of the "conversation speed" is referred to so as to adjust the speed of the voice omitted from the speaker 302. Furthermore, the field of the "selected term level" is referred to so as to adjust the politeness of the response speech sentence, the field of the "temper change frequency" is referred to so as to adjust the content of the response speech sentence, and the field of the "in-conversation gesture" is referred to so as to adjust an animation of the pseudo character 901 to be displayed on the display panel 303.

Note that the operation standard characterizing the character is not limited to the standard shown in FIG. 4. Other standards may be added or specific standard may be omitted. Moreover, a special standard may be prepared for a specific robot to be simulated.

Figure 5:
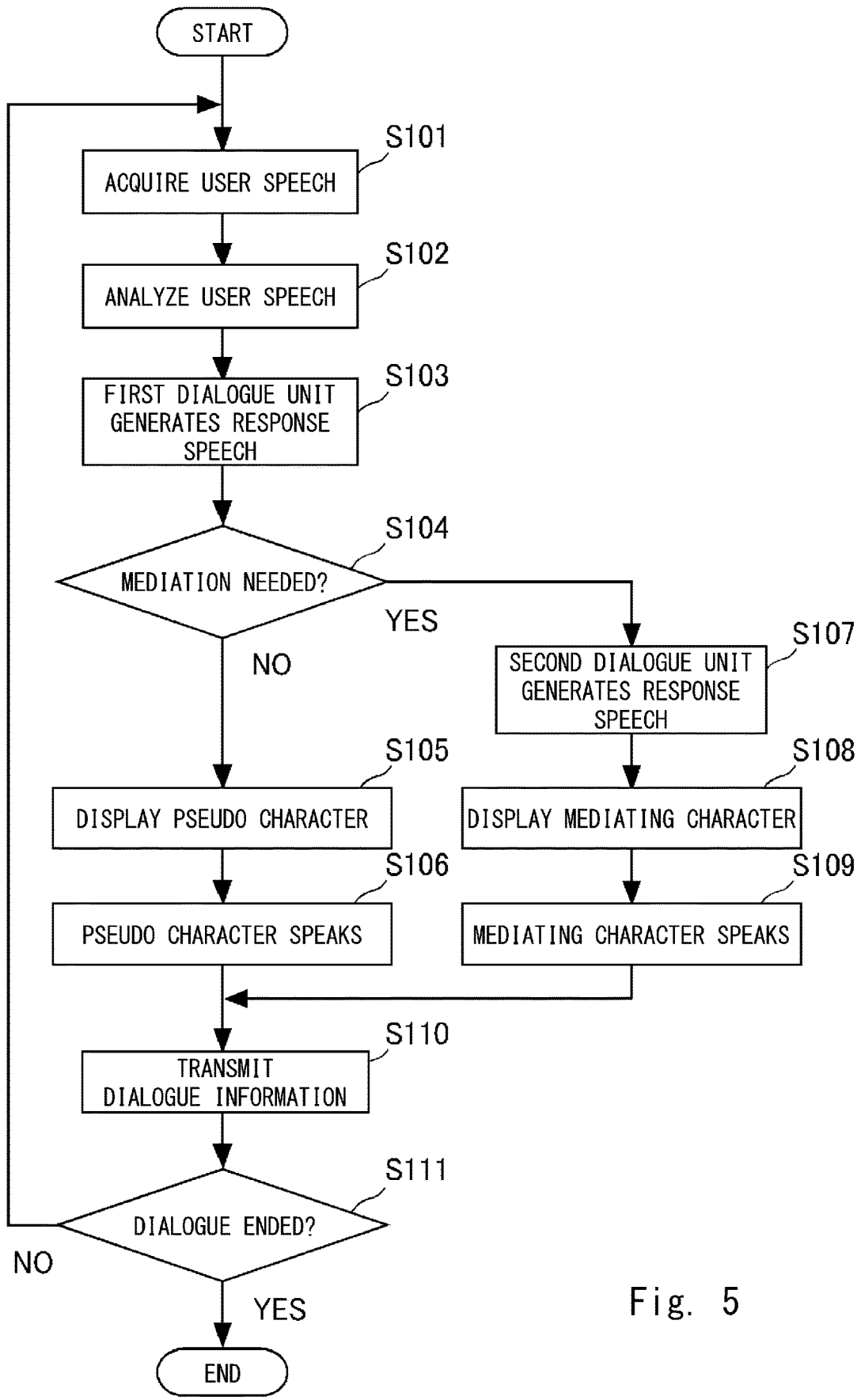
FIG. 5 is a flowchart of processing performed in a dialogue in a first environment.

Next, a flow of processing performed by the control unit 310 in the dialogue in the first environment will be described. FIG. 5 is a flowchart of processing that the control unit 310 executes in a dialogue in the first environment. The flowchart represents processing from when the user utters one phrase until when the communication terminal 300 returns one phrase. The flow is started when it is confirmed that the robot 100 is, not present in the surrounding.

In Step S101, when the control unit 310 acquires a user speech via the microphone 301, in Step S102, the speech analysis unit 311 analyzes and recognizes the user speech as an input speech. The speech analysis unit 311 passes the analysis result to the first dialogue unit 313.

In Step S103, the first dialogue unit 313 refers to the first table 331 to generate the response speech sentence for the input speech. The process proceeds to Step S104 where the arbitration unit 315 analyzes the response speech sentence generated in Step S103. Then, the arbitration unit 315 judges whether the response speech sentence generated in Step S103 is appropriate for the input speech. When the arbitration unit judges that the generated response speech sentence is appropriate for the input speech, it passes the next right to speak to the first dialogue unit 313, and the process proceeds to Step S105. On the other hand, when the response speech sentence generated in Step S103 does not make sense for the input speech or the response speech sentence is not generated in the first place, the arbitration unit 315 judges that the mediating character 902 needs to mediate the dialogue and passes the next right to speak to the second dialogue unit 314, and the process proceeds to Step S107.

When the process proceeds to Step S105, the first dialogue unit 313 acquires the video data of the pseudo character 901 from the character database 350, and displays the video data on the display panel 303. The first dialogue unit 313 also displays the text corresponding to the response speech sentence generated in Step S103. The process proceeds to Step S106 where the voice data is acquired from the speech database 340 and adjusted, and a voice corresponding to the response speech sentence generated in Step S103 is emitted from the speaker 302. Steps S105 and S106 may be processed in parallel so as to be linked to each other. When, the process of Step S106 is completed, the process proceeds to Step S110.

When the process proceeds to Step S107, the second dialogue unit 314 receives the analysis result calculated in Step S102, and further refers to the response speech sentence generated in Step S103 and the second table 332 to generate the response speech sentence for the input speech. By the second dialogue unit 314 referring to the response speech sentence generated in Step S103, the response speech sentence generated in Step S103 according to the content of the response speech sentence generated in Step S103 can be generated. For example, when the response speech sentence cannot be generated in Step S103, the response speech, sentence of "He said, 'I could not hear you very well, could you say it again?'" is generated. If the topic is shifted, the response speech sentence of "Taro seems not knowing xx" is generated.

After the response speech sentence is generated in Step S107, the process proceeds to Step S108 where the second dialogue unit 314 acquires the video data of the mediating character 902 from the character database 350 and displays it on the display panel 303. Further, the second dialogue unit 314 displays the text corresponding to the response speech sentence generated in Step S107. In Step S109, the voice data is acquired from the speech database 340 and adjusted, and the voice corresponding to the response speech sentence generated in Step S107 is emitted from the speaker 302. Steps S108 and S109 may be processed in parallel so as to be linked with each other. When the process of Step S109 is completed, the process proceeds to Step S110.

In Step S110, the control unit 310 adjusts the user speech sentence analyzed in Step S102 and the response speech sentence presented to the user into a predetermined data format, and transmits them from the communication unit 320 to the robot 100. The control unit 310 proceeds to Step S111 and judges whether the dialogue with the user is continuing or has been ended. For example, when the user does not speak within a predetermined time, it is judged that the dialogue has been ended. When it is judged that the dialogue has not been ended, the process returns to Step S111 and the series of processes is repeated. When it is judged that the dialogue has been ended, the display on the display panel 303 is stopped, and the series of processes is ended.

Figure 6A:
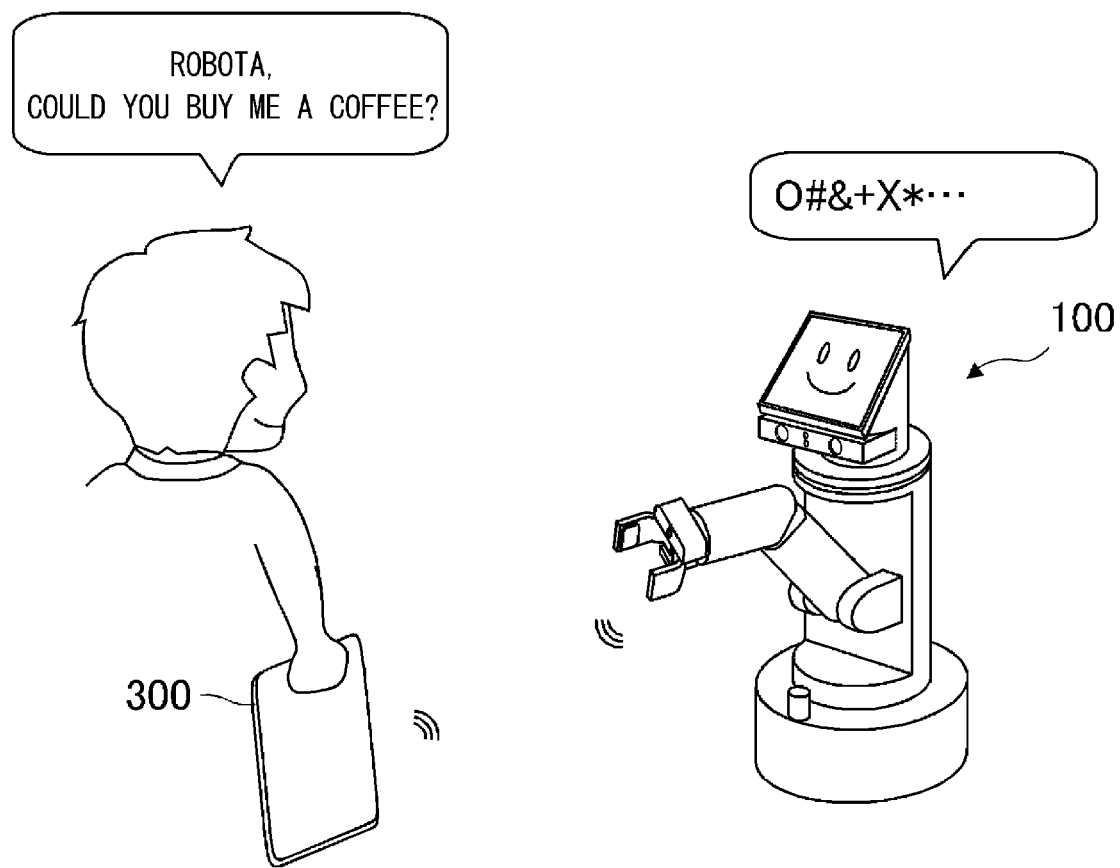
FIG. 6A is a view showing a state of a dialogue conducted in a second environment.
Figure 6B:
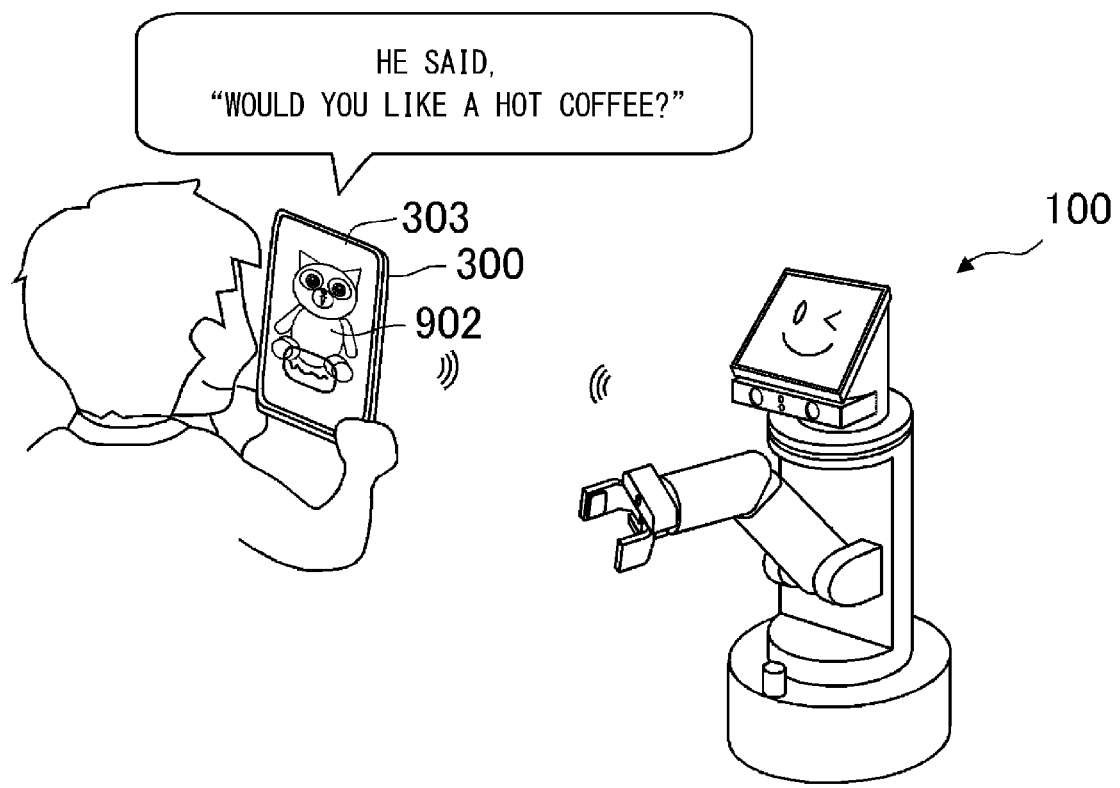
FIG. 6B is a view showing a state of a dialogue conducted in the second environment.

In the second environment of FIG. 1, the state in which the user has a dialogue with the robot 100 without the user holding the communication terminal 300 has been described. However, as described above, the dialogue between the user and the robot 100 does not proceed smoothly in many cases. Thus, a usage form in which the dialogue with the robot 100 smoothly proceed using the communication terminal 300 also in the second environment will be described. FIGS. 6A and 6B show a state in which a dialogue is conducted in the second environment.

FIG. 6A shows how a failure occurs in the dialogue with the robot 100. Specifically, FIG. 6A shows a state in which, even when the user speaks to the robot 100, "Robota, could you buy me a coffee?", the robot 100 utters a response speech not making sense. At this time, if the user holds the communication terminal 300, the communication terminal 300 can acquire the response speech sentence generated by the robot 100 through communication. The communication terminal 300 judges that the acquired response speech sentence does not make sense as a dialogue.

FIG. 6B shows a state in which the mediating character 902 is displayed on the display panel 303 of the communication terminal 300, and the mediating character 902 assists the dialogue between the user and the robot 100. The communication terminal 300 acquires the user speech that the user speaks to the robot 100. When the response speech of the robot 100 acquired from the robot 100 does not make sense, the communication terminal 300 generates the response speech sentence for the user and outputs it. Specifically, as shown in the drawing, in response to the user speech, "Robota, could you buy me a coffee?", a voice such as "He said, 'would you like a hot coffee?'" and displays the text. At this time, the communication terminal 300 transmits, to the robot 100, the dialogue information about the output response speech sentence. The robot 100 can continue the subsequent dialogue without contradiction by referring to the received dialogue information.

Figure 7:
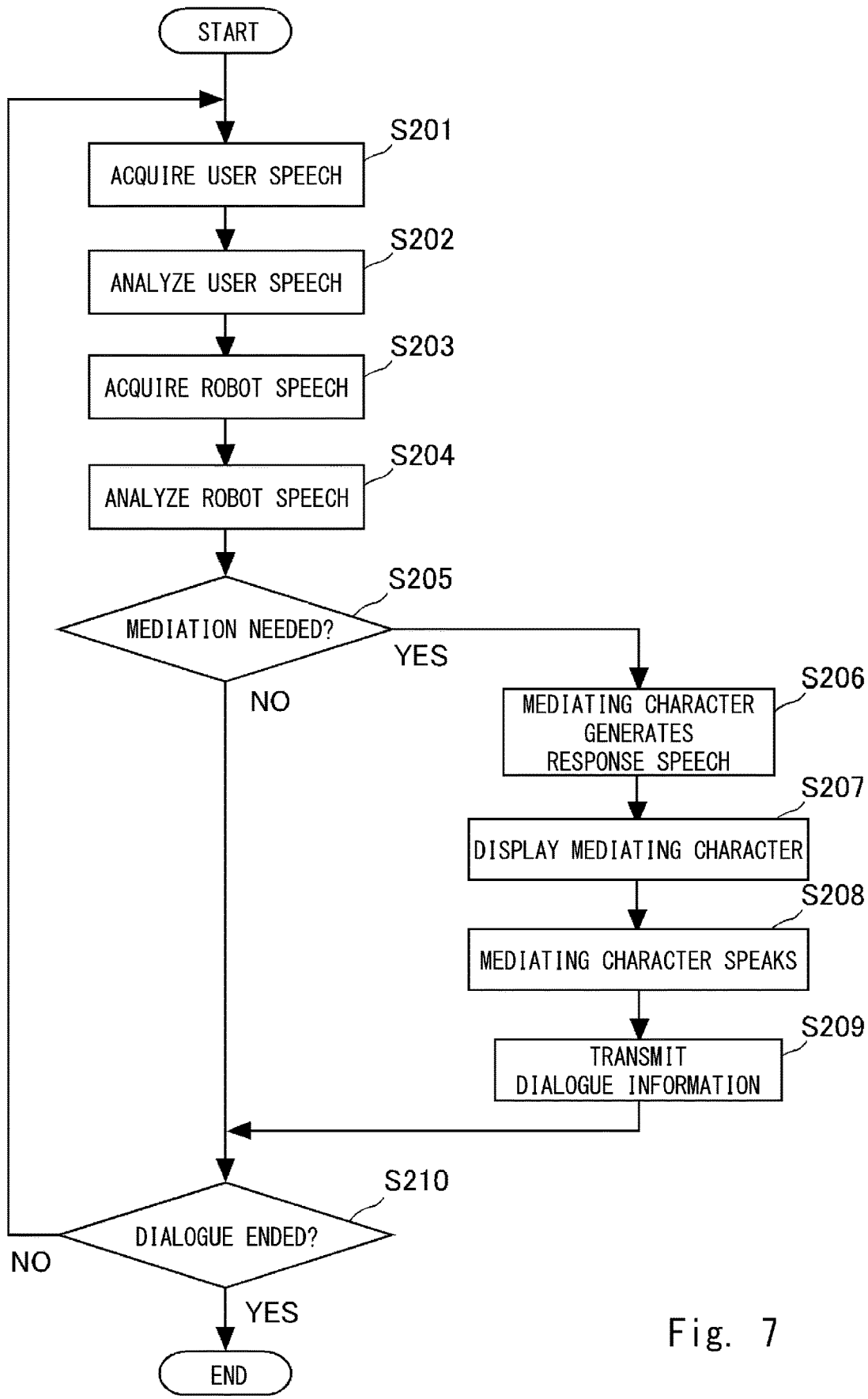
FIG. 7 is a flowchart of processing performed in a dialogue in the second environment.

FIG. 7 is a flowchart of processing performed by the control unit 310 in the dialogue in the second environment described with reference to FIG. 6. The flowchart shows processing from when the user utters one phrase until when robot 100 returns one appropriate phrase or when one phrase assisted by the communication terminal 300 is returned. The flow is started when it is confirmed that the robot 100 is present in the surrounding. The control unit 310 judges whether the robot 100 is present in the surrounding, for example, by comparing location information of the robot 100 acquired via the communication unit 320 with location information of the communication terminal 300. When the wireless unit for proximity communication is mounted, the control unit 310 may make such a judgment by whether the proximity communication can be established.

In Step S201, when the control unit 310 acquires the user speech via the microphone 301, in Step S202, the speech analysis unit 311 analyzes and recognizes the user speech as an input speech. The speech analysis unit 311 passes the analysis result to the arbitration unit 315.

When the control unit 310 acquires a robot speech emitted by the robot 100 via the microphone 301 in Step S203, in Step S204, the speech analysis unit 311 analyzes and recognizes, the robot speech as a response speech. The speech analysis unit 311 passes the analysis result to the arbitration unit 315.

When the process proceeds to Step S104, the arbitration unit 315 judges whether the robot speech analyzed in Step S204 establishes a dialogue with the user speech analyzed in Step S202. When it is judged that the robot speech analyzed in Step S204 does establish a dialogue with the user speech analyzed in Step S202, the process proceeds to Step S210. When it is judged that the robot speech analyzed in Step S204 does not establish a dialogue with the user speech analyzed in Step S202, the process proceeds to Step S206.

When the process proceeds to Step S206, the second dialogue unit 314 receives the analysis result calculated in Step S202, and further refers to the analysis result calculated in Step S204 and the second table 332 to generate the response speech sentence for the user speech.

After the response speech sentence is generated in Step S206, the process proceeds to Step S207 where the second dialogue unit 314 acquires the video data of the mediating character 902 from the character database 350 and displays it on the display panel 303. The second dialogue unit 314 also displays the text corresponding to the response speech sentence generated in Step S206. The process proceeds to Step S208 where the voice data is acquired from the speech database 340 and adjusted, and a voice corresponding to the response speech sentence generated in Step S206 is emitted from the speaker 302, Steps S207 and S208 may be processed in parallel so as to be linked to each other. The process proceeds to Step S209 where the control unit 310 adjusts the response speech sentence generated in Step S206 into a predetermined data format, and transmits it from the communication unit 320 to the robot 100.

In Step S210, the control unit 310 judges whether the dialogue between the user and the robot 100 is continuing or has been ended. When it is judged that the dialogue has not been ended, the process returns to Step S201 and the series of processes is repeated. When it is judged that the dialogue has been ended, the display on the display panel 303 is stopped, and the series of processes is ended.

In this way, in the second environment where the user can have a dialogue with the robot 100, the dialogue by the first dialogue unit 313 is not conducted. That is, the pseudo character 901 is not explicitly shown. By performing control in this manner, a feeling of switching between the robot 100 and the pseudo character 901 can be produced. In other words, further integrity can be given to the robot 100 as an external communication robot capable of having a dialogue with the pseudo character 901 of the communication terminal 300. Moreover, as described above, in the environment where the user and the robot 100 have a dialogue, the user can enjoy the dialogue smoothly with the robot 100 by the second dialogue unit 314 mediating and assisting the dialogue between the user and the robot 100.

In the above-described embodiment, the communication terminal 300 outputs the generated response speech sentence in a text and a voice, but it may output the generated response speech sentence in either a text or a voice. The apparatus may be configured to enable the user to select how the response speech sentence is to be output according to the usage environment, etc.

Further, although the processing flow described with reference to FIG. 5 executed in the first environment is to generate the response speech sentence without referring to the history data 333, the response speech sentence may be generated with reference to the history data 333 as a matter of course. In this case, not only the response speech sentences generated by the first dialogue unit 313 and the second dialogue unit 314 in the past may be referred to as the dialogue information, but also the response speech sentences spoken by the robot 100 in the past may be referred to as the dialogue information. By referring to the past response speech sentences in this way, it is possible to give more depth and variations to the dialogues.

In the above-described embodiment, as described with reference to FIG. 2, the display mode is described in which one of the pseudo character 901 and the mediating character 902, which is the main speaker, is displayed large on the display panel 303. However, the display mode is not limited to this. A display screen may be divided, and one of the divided display screen may be a display region for the pseudo character 901, and the other one of the divided display screen may be a display region for the mediating character 902.

Further, in the embodiment described above, the robot 100 is described as a service robot capable of autonomous movement. However, a robot with which the user can communicate in a real environment is not limited to this kind. For example, the robot may be a communication robot fixedly installed in an amusement park, etc. In terms of a robot capable of communicating only in a specific place, the robot does not necessarily have to have a visible outer shape of some kind.

Further, in the embodiment described above, the case has been described in which the mediating character 902 conducts the dialogue between the user and the pseudo character 901 or the dialogue between the user and the robot 100. However, the mediating character 902 may speak something other than words for mediation. That is, the user and the mediating character 902 may be able to conduct a dialogue of a unique content separated from the dialogue with the robot 100. In this case, the pseudo character 901 may be able to speak something reflecting a content of the dialogue conducted between the user and the mediating character 902. Further, the pseudo character 901 and the mediating character 902 may be configured to be able to have a dialogue with each other. Such a configuration facilitates the user to recognize that the pseudo character 901 and the mediating character 902 are independent characters. Further, the speech content will have more depth, and the communication will be improved.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A dialogue apparatus comprising:
   a display unit;
   an external communication robot capable of having a dialogue to conduct the dialogue with a user;
   a first dialogue control unit configured to display a first character on the display unit and simulate a speech function of the external communication robot;
   a second dialogue control unit configured to display a second character on the display unit and conduct the dialogue so as to mediate the dialogue between the user and the first dialogue control unit; and
   a transmission unit configured to transmit, to the external communication robot, dialogue information about the dialogue conducted by the first dialogue control unit and the second dialogue control unit,
   wherein:
   the first dialogue control unit controls the first character to conduct the dialogue with the user when the user is present in a first environment where the external communication robot is not present, and
   the external communication robot conducts the dialogue with the user when the user is present in a second environment where the external communication robot is present.

2. The dialogue apparatus according to claim 1, further comprising a reception unit configured to receive the dialogue information about the dialogue conducted by the external communication robot, wherein
   the first dialogue control unit conducts the dialogue based on the dialogue information received by the reception unit.

3. The dialogue apparatus according to claim 2, wherein the first dialogue control unit does not conduct the dialogue in the second environment where the user can have the dialogue with the external communication robot.

4. The dialogue apparatus according to claim 3, wherein the second dialogue control unit conducts the dialogue so as to mediate the dialogue between the user and the external communication robot in the second environment.

5. The dialogue apparatus according to claim 1, wherein the second dialogue control unit conducts the dialogue so as to supplement a speech limited by the speech function of the external communication robot.

6. The dialogue apparatus according to claim 1, wherein the speeches by the first dialogue control unit and the second dialogue control unit are executed via at least one of a voice emitted from a speaker or a text displayed on the display unit.

7. The dialogue apparatus according to claim 1, further comprising an arbitration unit configured to monitor the dialogue between the user and the first character, and to determine whether the second character needs to mediate the dialogue or not,
   wherein the second dialogue control unit generates a response speech sentence so as to assist the dialogue between the user and the first character when the second character needs to mediate the dialogue.

8. The dialogue apparatus according to claim 4, further comprising an arbitration unit configured to monitor the dialogue between the user and the external communication robot, and to determine whether the second character needs to mediate the dialogue or not,
   wherein the second dialogue control unit generates a response speech sentence so as to assist the dialogue between the user and the external communication robot.

9. A non-transitory computer readable medium storing a control program of a dialogue apparatus causing a computer to execute:
   a first dialogue control step of displaying a first character on a display unit and simulating a speech function of an external communication robot capable of having a dialogue to conduct the dialogue with a user, wherein first character conducts the dialogue with the user when the user is present in a first environment where the external communication robot is not present;
   a second dialogue control step of displaying a second character on the display unit and conducting the dialogue so as to mediate the dialogue with the user in the first dialogue control step; and
   a transmitting step of transmitting, to the external communication robot, dialogue information about the dialogue conducted in the first dialogue control step and the dialogue conducted in the second dialogue control step,
   wherein the external communication robot conducts the dialogue with the user when the user is present in a second environment where the external communication robot is present.

* * * * *